United States Patent [19]

Simon et al.

[11] Patent Number: 5,122,426
[45] Date of Patent: Jun. 16, 1992

[54] GAS-TIGHT, SEALED ALKALINE SECONDARY CELL

[75] Inventors: Gerhard Simon; Klaus Kleinsorgen; Uwe Kohler, all of Kelkheim, Fed. Rep. of Germany

[73] Assignee: Varta Batterie Aktiengesellschaft, Hanover, Fed. Rep. of Germany

[21] Appl. No.: 569,078

[22] Filed: Aug. 17, 1990

[30] Foreign Application Priority Data

Sep. 4, 1989 [DE] Fed. Rep. of Germany ....... 3939304

[51] Int. Cl.$^5$ .......................................... H01M 10/52
[52] U.S. Cl. ..................................... 429/59; 502/101; 427/415
[58] Field of Search .................... 429/57, 59, 42, 248; 427/58, 415; 29/623.5; 502/101

[56] References Cited

U.S. PATENT DOCUMENTS

| | | | |
|---|---|---|---|
| 2,104,973 | 1/1938 | Dassler | 429/59 |
| 3,080,440 | 3/1963 | Reutschi et al. | 429/59 |
| 4,518,705 | 5/1985 | Solomon et al. | 502/101 |
| 4,925,747 | 5/1990 | Kordesch et al. | 429/59 |
| 4,987,041 | 1/1991 | Simon | 429/59 |

*Primary Examiner*—Stephen Kalafut
*Attorney, Agent, or Firm*—Weiser & Stapler

[57] ABSTRACT

An auxiliary electrode for improving the consumption of oxygen in a gas-tight, sealed alkaline secondary cell is comprised of a synthetic nonwoven fabric and a film rolled onto the fabric. The film is a PTFE-bound activated carbon, and the side of the nonwoven fabric receiving the film is first impregnated with an aqueous cellulose ether mixture to develop a three layer structure including a highly porous, hydrophobic layer made of the nonwoven material, left in its original state and facing the electrolyte or a gas supply, a hydrophilic impregnated layer, and a catalytically active hydrophobic consumption layer electrically connected with the cell's negative electrode and constituting the preferred location for oxygen reduction, at the resulting hydrophobic/hydrophilic transition layer. The auxiliary electrode is located outside of the ionic path between electrodes of opposite polarity, but in electron-conducting contact with the negative electrode, excluding the auxiliary electrode from unwanted interaction with the $NO_2/NH_3$—auto-discharge path.

22 Claims, 3 Drawing Sheets

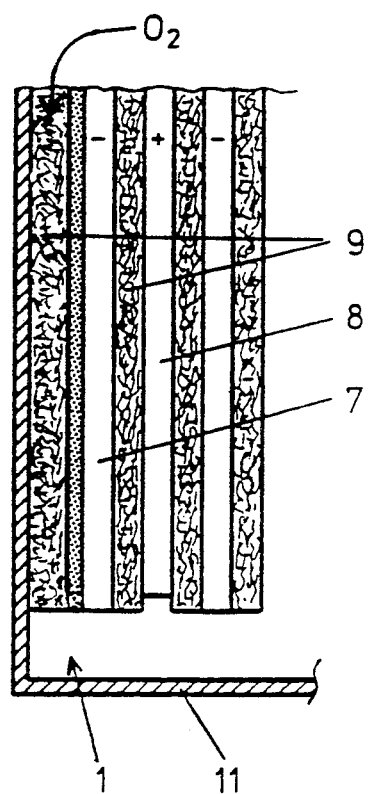

GAS-TIGHT, SEALED ALKALINE SECONDARY CELL

BACKGROUND OF THE INVENTION

This invention is directed to a gas-tight, sealed alkaline secondary cell with positive and negative electrodes, an intermediate separator, and a layered auxiliary electrode that is electron-conductively connected with the negative electrode for reducing oxygen pressure. The present invention finds applicability to all types of gas-tight alkaline cells which operate on an oxygen-consumption cycle, especially Ni/Cd, Ni/Zn and Ni/hydride storage batteries.

As is known, an accumulation of oxygen generally results when the cells of this type are overcharged. However, this can be effectively prevented by "enlarging" the surface of the negative electrode, through electrical connection with an appropriate auxiliary electrode. In so doing, the oxygen-consumption reaction $$O_2 + 2H_2O + 4e^- \rightarrow 4\,OH^-$$

is kinetically hindered to a lesser extent on the auxiliary electrode than on the negative (main) electrode, as is desired. To this end, the negative auxiliary electrode may contain any of a number of catalysts, including metals such as platinum, silver and copper, or carbon, and is preferably highly porous to develop a large inner surface.

The amount of electrolyte used is of critical consequence to oxygen consumption since, on the one hand, only a small amount of electrolyte should be used for preventing overcharging, while on the other hand, loading of the cell with high currents requires a large amount of electrolyte. To provide a proper balance, the amount of electrolyte should be adjusted to establish the three-phrase equilibrium which is needed on the active electrode surface for the conversion of oxygen. As distinguished from gas-tight Ni/Cd cells, in Ni/hydride cells a complete collection of oxygen gas is made particularly important for this reason, because the active alloy corrodes in its presence.

In adapting to the generally relatively narrow electrode structure of storage batteries exhibiting high energy density and power density, the auxiliary electrodes (as are the electrode plates) are thin, layer-like forms which are often closely adjacent to the negative plates in the stack of plates comprising the cell.

DE-AS 15 96 223 discloses a Ni/Cd storage battery with an auxiliary electrode, formed as a coiled cell in which the auxiliary electrode covers the final spiral of the negative electrode and at the same time is in close contact with the inner wall of the housing which forms the negative cell pole. This cover layer on the negative electrode contains finely divided silver (or some other metal more electropositive than cadmium) in a porous, hydrophobic carrier material so that when in contact with the negative electrode, a negative mixed electrode is formed on which the rate of oxygen reduction is increased.

DE-PS 28 38 857 discloses a metal oxide/lanthanum nickel hydride storage battery having an oxygen-reduction electrode comprised of a nickel network coated with carbon black. The nickel network is short-circuited (wired) with the negative electrode and is covered near the positive electrode with a separator which possesses an affinity for electrolyte which is less than that of the two main electrodes, so that the flow of oxygen is only slightly hindered. In contrast, the hydride electrodes are to the extent possible protected against diffusing oxygen by insulation with a second separator material which, in the wet state, possesses a relatively low gas permeability.

SUMMARY OF THE INVENTION

It is the primary object of the present invention to promote the conversion of oxygen in a gas-tight, alkaline secondary cell operating with an auxiliary electrode, to promote the effectiveness and durability of the system.

It is also the object of the present invention to provide a gas-tight, alkaline secondary cell of this type which, to the extent possible, additionally prevents the $NO_2/NH_3$-auto-discharge path which is likewise catalyzed by the auxiliary electrode.

These and other objects are achieved in accordance with the present invention by providing a gas-tight, sealed alkaline secondary cell having at least one positive electrode, at least one negative electrode, and an intermediate separator, with a layered auxiliary electrode that is electrically (electron-conductively) connected with the negative electrode for reducing oxygen pressure. The auxiliary electrode is comprised of three layers including a hydrophobic and electrically nonconductive first layer for promoting the access of oxygen, a hydrophilic second layer, and a hydrophobic third layer electrically connected with the negative (main) electrode for catalyzing the reduction of oxygen.

It has proven to be quite favorable to provide the cell with an auxiliary electrode having a three-layer structure in which each layer, due to its special properties, takes into account the varied requirements for efficient oxygen consumption. For example, the electrically nonconducting first layer, due to its high porosity and hydrophobic character, forms a gas-conducting layer by means of which oxygen acquires ready access to the reaction zone, while preventing penetration of the liquid electrolyte. The presence of water necessary for oxygen reduction is ensured by the second, hydrophilic layer, which provides a moisture reservoir for continuous wetting of the third, catalyst layer (the actual consumption layer).

What is more, since the catalyst layer can be adjusted hydrophobically by means of a synthetic binder additive to the catalyst, a zone which is both hydrophobic and hydrophilic in nature extends between the second and third layers of the auxiliary electrode of the present invention, which provides ideal conditions for an effective three-phase equilibrium.

For further detail regarding an alkaline secondary cell produced according to the present invention, reference is made to the detailed description which is provided below, taken in conjunction with the following illustration.

BRIEF DESCRIPTION OF THE DRAWINGS

FIGS. 3, 3a and 4 are partial, cross-sectional views showing arrangements of the auxiliary electrode in coiled cells.

In the several views provided, like reference numbers denote similar structure.

DETAILED DESCRIPTION OF THE PREFERRED EMBODIMENTS

Figure 1:
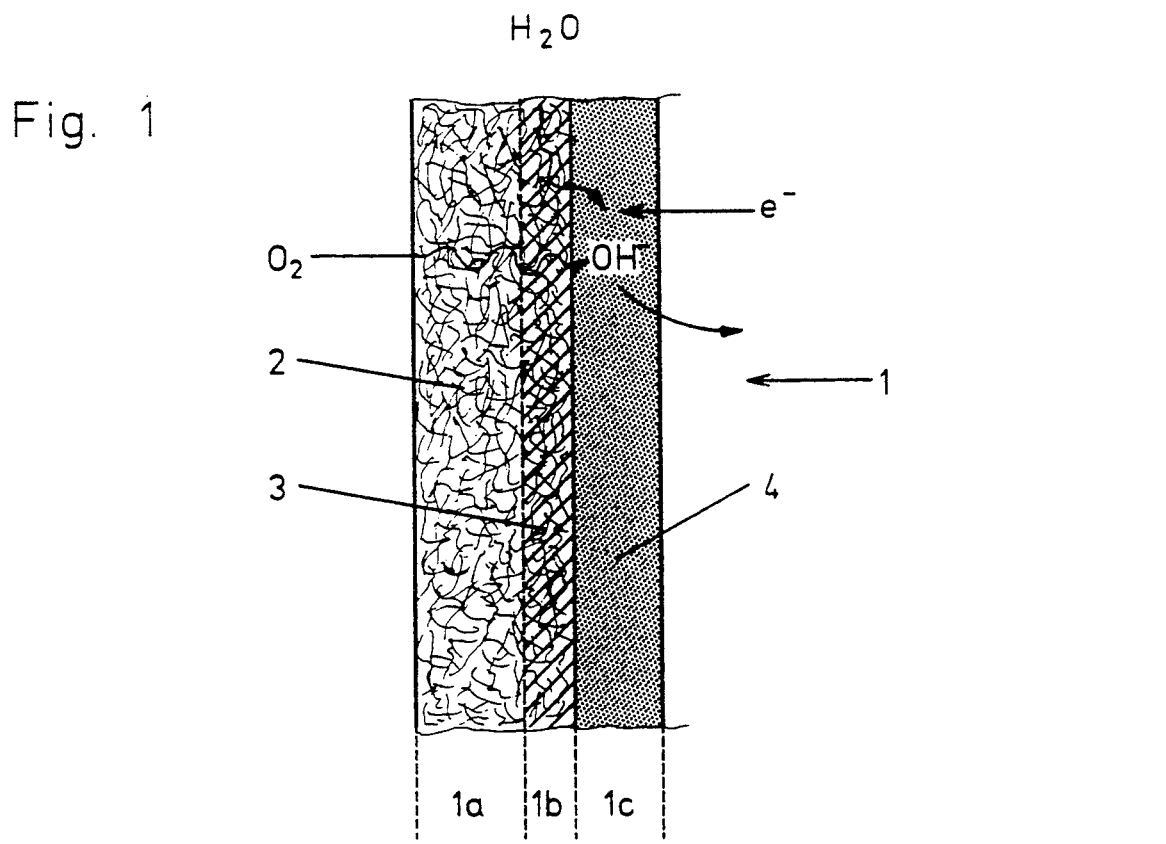
FIG. 1 is a partial, cross-sectional view showing the layered auxiliary electrode of the present invention.

Referring to FIG. 1, a first layer 1a of a three-layer electrode 1 is formed of a synthetic nonwoven fabric 2, left in its original state. The second layer 1b of the three-layer electrode 1 is developed by impregnating one side of the nonwoven fabric 2 with an aqueous tylose mixture 3. As a consequence, the layer 1b of the nonwoven fabric 2 is made hydrophilic. The third layer 1c of the three-layer electrode 1 is formed as a film 4 which is rolled from an activated carbon mixture. In addition, this third layer 1c can contain a netted metallic insert (e.g., made of nickel), which can be used to place the third layer 1c in electrical contact with the negative (main) electrode. As a rule, the third layer 1c will be at least in electron-conducting contact with the negative (main) electrode, and will often be in close mechanical contact as well.

The material forming the first two layers 1a, 1b of the auxiliary electrode 1 preferably constitutes a single-layer, highly porous synthetic nonwoven fabric 2, preferably with a 90 to 99% pore volume. The hydrophobic properties of this material ensure a passage for oxygen flow, even in long-term operation.

By coating a portion of the nonwoven fabric 2 with a hydrous tylose mixture (collectively, tylose is the name for a large assortment of water-soluble cellulose ethers, especially methyl cellulose and carboxymethyl cellulose), a hydrophilic layer (the second layer 1b) is produced in the nonwoven fabric. Thus, the nonwoven fabric 2 maintains its original hydrophobic character on the outer side (the first layer 1a) of the layered structure, since the tylose penetrates only to a certain depth in the nonwoven fabric. Nevertheless, due to its hydrophilic character, the nonwoven fabric 2 will always entrain a certain amount of electrolyte, which is sufficient to continuously wet the adjacent catalyst (or consumption) layer. In this manner, a drying out and thus a decrease in function of the auxiliary electrode is avoided.

The catalytically active third layer 1c is comprised of 50 to 80 wt. % activated carbon, 3 to 20 wt. % carbon black (possibly graphite) as the conducting medium, and 10 to 30 wt. % PTFE. This material is formed as a rolled mixture of the indicated components. An especially favorable mixture for this purpose is comprised of about 75 wt. % activated carbon, 7.5 wt. % conducting carbon black, and 17.5 wt. % PTFE.

The combination of activated carbon and water-repellent PTFE ensures, in the area of transition with the tylose-containing, hydrophilic second layer 1b, a presence of plural three-phase boundaries with large inner surfaces important for the conversion of oxygen. The added conducting carbon black facilitates electron transfer to the oxygen-consuming regions of this zone. In such case, needed electrons are supplied from the negative electrode of the gas-tight storage battery, with which the consumption layer 1c is in direct, and preferably flat, connection.

The mechanism for the oxygen reduction carried out on the auxiliary electrode 1 is as follows. Oxygen from the cell's gas or electrolyte containing volume readily penetrates the largely electrolyte-free, highly porous layer 1a and is converted (with $H_2O$) within the hydrophobic layer 1c according to the earlier indicated reaction equation. The water further operates to maintain the hydrophilic (electrolyte-entraining) layer 1b available in the immediate vicinity of this reaction. Hydroxyl ions result as the reaction product, by the take-up of electrons from the negative electrode.

Figure 2:
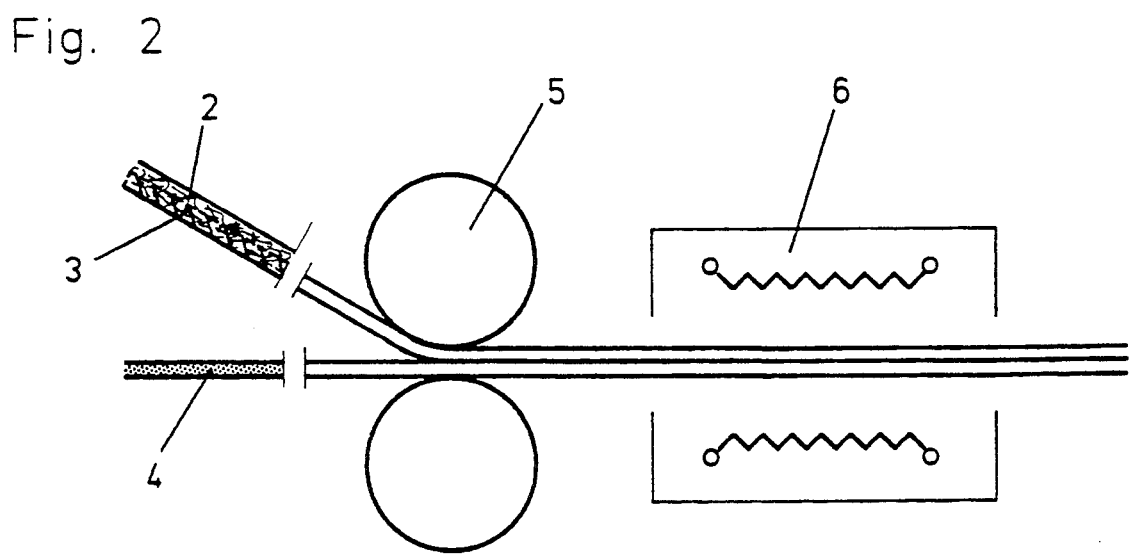
FIG. 2 is a schematic view showing a method for producing the auxiliary electrode.

The process for producing an auxiliary electrode 1 according to the present invention is rather straightforward, as shown in FIG. 2 of the drawings. As illustrated, an appropriate powder mixture (from the above-mentioned components) is rolled into a film 4 to develop the catalyst layer 1c, while in a separate operation, a 1 to 2% aqueous tylose mixture 3 is applied to a synthetic nonwoven fabric 2 to develop the layers 1a, 1b. The nonwoven fabric 2 and the film 4 are then delivered to a calender 5, preferably as continuous webs, and are connected with one another (under light pressure) by the tylose layer, which is still wet and which functions as an acceptable adhesive. Subsequently, the combined laminate is passed through a dryer 6.

Figure 3:
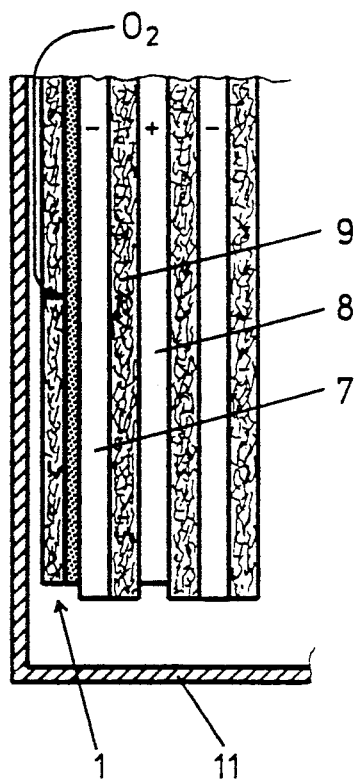
Figure 4:
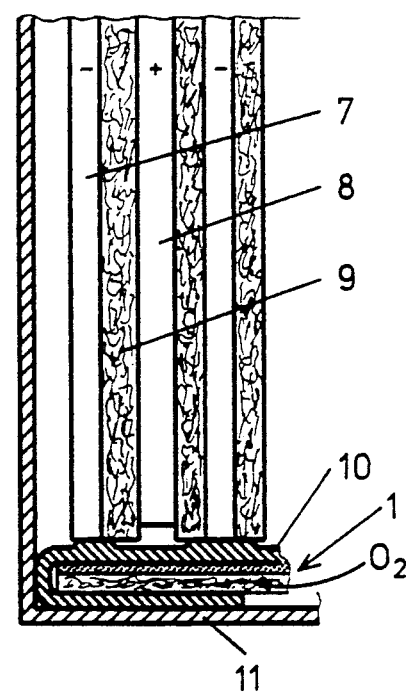
Figure 5:
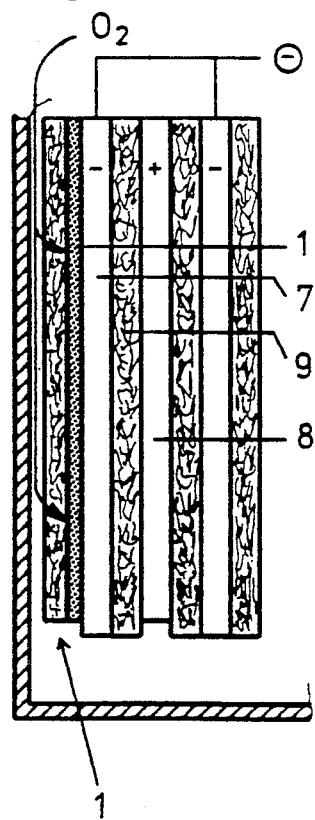
FIGS. 5 to 7 are cross-sectional views showing arrangements of the auxiliary electrode in cells with stacked plate groups.
Figure 6:
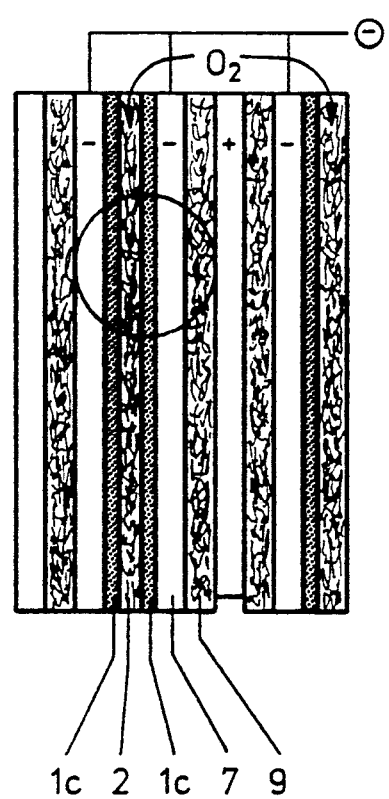
Figure 7:

FIGS. 3 to 7 illustrate some possibilities for positioning the auxiliary electrode 1 of the present invention in gas-tight coiled cells (FIGS. 3 and 4) and in stacked cells (FIGS. 5 to 7). In each case, the illustrations provided show in detail the auxiliary electrode 1, the negative electrode 7, the positive electrode 8, the separator 9, the electrical connection with the negative electrode (e.g., multi-contact plate) and the cell vessel 11. The arrows marked $O_2$ indicate the preferred orientation of the auxiliary electrode, i.e., with the first layer 1a (to be accessed by the oxygen gas) facing outwardly.

For example, in a round cell with coiled electrodes, the auxiliary electrode can be placed either adjacent to the outer end of the spiral coil which is formed by the negative electrode, as shown in FIG. 3, or may take the form of a disk, or possibly a stack of several disks, attached opposite an edge (side) of the coil (e.g., close to the bottom of the cell), as shown in FIG. 4. It is particularly advantageous to combine the auxiliary electrode with a multi-contact plate, to develop the current conductor for the negative electrode(s) in coiled cells with sintered foil electrodes.

An especially advantageous arrangement for the auxiliary electrode of the present invention can be realized in a coiled cell as shown in FIG. 3a by providing a separator 9 between the positive electrode 8 and the negative 7 electrode (with the latter forming the outer coil spiral) which extends sufficiently forward over the end of the negative electrode to envelope the electrode coil, and by then applying an aqueous tylose paste to the extended end of the separator, on one side, and pressing a prerolled catalyst mixture onto the tylose-wetted side of the separator. Preferably, the side of the extended separator to be treated with the tylose paste is the side which is turned away from the vessel wall, so that when the coil is pre-assembled and inserted into the vessel, the dry side of the free separator end is adjacent to the vessel wall, and the catalyst side is adjacent to the negative electrode. Note this also corresponds to the sectional representation shown in FIG. 3.

By taking measures according to the present invention, the nonwoven fabric separator 2 serves as the base material for both the hydrophobic layer 1a and for the hydrophilic layer 1b of the auxiliary electrode, to which only the catalyst layer 1c remains to be added. In this case, it is not essential to the function of the auxiliary electrode whether the consumption layer 1c or the gas-conducting layer 1a is positioned adjacent to the negative electrode. In contrast, it is important that the auxiliary electrode 1 be arranged outside of the area of influence of the auto-discharge path. Since this takes place between a positive and a negative electrode, the auxiliary electrode, if it is not to support this effect, should be arranged outside of the ionic path between the electrodes of opposite polarity. This condition can be fulfilled, as most of the examples (FIGS. 3 and 5 to 7) here show, at least in that the auxiliary electrode 1 is either positioned between two negative electrodes, or is shielded from a negative electrode opposite a positive electrode.

As previously indicated, the laminated auxiliary electrode 1 of the present invention can also be arranged in various ways in cells with stacked plate groups. For example, as shown in FIG. 5, the terminating negative plate of the plate group of negative electrodes 7, positive electrodes 8 and separators 9 is covered with the auxiliary electrode 1, with the consumption layer 1c or catalyst film 4 of the auxiliary electrode 1 placed adjacent to the major face of the negative electrode. FIG. 6 illustrates a sandwich-like design employing the auxiliary electrode 1 of the present invention, wherein the synthetic nonwoven fabric 2 is provided with a tylose-impregnated layer 1b on both sides, with a middle zone remaining unchanged to function as the hydrophobic gas-conducting layer 1a, and with consumption layers 1c connected to the tylose-impregnated layers 1b, on both sides. In this case, the plate stack is arranged such that the sandwich-like auxiliary electrode 1 is always located between two negative electrodes. FIG. 7 reproduces the circled section of FIG. 6 in greater detail, to more clearly illustrate the structure involved.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. A gas-tight, sealed alkaline secondary cell comprising at least one positive electrode, at least one negative electrode, an intermediate separator and a layered auxiliary electrode in electron-conducting connection with the negative electrode for reducing oxygen pressure, wherein the auxiliary electrode is comprised of three layers including a hydrophobic and electrically nonconductive first layer for promoting access of oxygen, a hydrophilic second layer, and a hydrophobic third layer in electron-conducting contact with the negative electrode for maintaining a catalytic oxygen reduction.

2. The secondary cell of claim 1 wherein a synthetic nonwoven fabric is on one side provided with a hydrous cellulose ether mixture, for developing the first and second layers of the auxiliary electrode.

3. The secondary cell of claim 2 wherein a film-like rolled activated carbon mixture is laminated to the synthetic nonwoven fabric on the side that is provided with the cellulose ether mixture.

4. The secondary cell of claim 1 wherein the third layer is a film-like rolled activated carbon mixture.

5. The secondary cell of claim 4 wherein the activated-carbon-containing rolled mixture is comprised of 50 wt. % to 80 wt. % activated carbon, 3 wt. % to 20 wt. % conducting carbon black and 10 wt. % to 30 wt. % PTFE.

6. The secondary cell of claim 5 wherein the activated-carbon-containing rolled mixture is comprised of about 75 wt. % activated carbon, about 7.5 wt. % conducting carbon black, and about 17.5 wt. % PTFE.

7. The secondary cell of claim 4 wherein the film-like third layer incorporates a metallic insert.

8. The secondary cell of claim 1 wherein the auxiliary electrode is arranged outside of ionic paths between electrodes of opposite polarity.

9. The secondary cell of claim 8 wherein the auxiliary electrode is shielded from the positive electrode by negative electrodes.

10. The secondary cell of claim 8 wherein the cell is comprised of coiled electrodes, and wherein the auxiliary electrode is an extension of the separator passing beyond the coiled negative electrode, one side of said extension being coated with a cellulose ether mixture and including a catalytically active coating.

11. The secondary cell of claim 10 wherein the separator extension is positioned adjacent to an inner wall of a vessel for the cell.

12. The secondary cell of claim 11 wherein the side of the extension coated with the cellulose ether mixture and provided with the catalytically active coating is turned away from the inner wall of the vessel.

13. The secondary cell of claim 8 wherein the cell is comprised of coiled electrodes, and wherein the auxiliary electrode is positioned opposite end portions of the coil.

14. The secondary cell of claim 13 wherein the auxiliary electrode includes a multi-contact plate forming a current conductor for the negative electrode.

15. The secondary cell of claim 8 wherein the cell is formed as a stacked plate group, and wherein the auxiliary electrode forms a portion of said stacked plate group.

16. The secondary cell of claim 15 wherein the auxiliary electrode is in contact with an outermost negative electrode of the stacked plate group.

17. The secondary cell of claim 15 wherein the auxiliary electrode is sandwiched between negative electrodes of the stacked plate group.

18. The secondary cell of claim 17 wherein opposite sides of a synthetic nonwoven mat are provided with a hydrous cellulose ether mixture, developing a first layer separating outer second layers of the auxiliary electrode.

19. The secondary cell of claim 18 wherein a film-like rolled activated carbon mixture is laminated to the sides of the synthetic nonwoven mat provided with the cellulose ether mixture.

20. An auxiliary electrode for a gas-tight, sealed alkaline secondary cell, comprised of three layers including a hydrophobic and electrically nonconductive first layer for promoting access of oxygen, a hydrophilic second layer, and a hydrophobic third layer for electron-conducting contact with a negative electrode of the secondary cell, for maintaining a catalytic oxygen reduction.

21. A method for making an auxiliary electrode structure, comprising the steps of:
coating one side of a synthetic nonwoven fabric with a hydrous cellulose ether mixture;
rolling an activated carbon mixture to form a film-like rolled activated layer for maintaining a catalytic oxygen reduction; and
joining the coated side of the synthetic nonwoven fabric to the film-like rolled activated layer.

22. A method for making an auxiliary electrode structure, comprising the steps of:
   forming a coiled electrode structure including a positive and negative electrode, and a separator having an extension passing beyond the coiled negative electrode;
   coating a side of the separator extension with a cellulose ether mixture; and
   coating the mixture-coated side of the separator extension with an active material for maintaining a catalytic oxygen reduction.

* * * * *